US008243947B2

(12) United States Patent
Lee et al.

(10) Patent No.: US 8,243,947 B2

(45) Date of Patent: Aug. 14, 2012

(54) IMAGE APPARATUS AND METHOD FOR TRANSMITTING AUDIO DATA

(75) Inventors: Seung-su Lee, Suwon-si (KR); Dae-kyoung Noh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1114 days.

(21) Appl. No.: 12/127,438

(22) Filed: May 27, 2008

(65) Prior Publication Data

US 2009/0154721 A1 Jun. 18, 2009

(30) Foreign Application Priority Data

Dec. 13, 2007 (KR) ........................ 10-2007-0130145

(51) Int. Cl.
*H04B 3/00* (2006.01)

(52) U.S. Cl. ........................................................ 381/77

(58) Field of Classification Search ..................... 381/77
See application file for complete search history.

(56) References Cited

U.S. PATENT DOCUMENTS 6,985,530 B1 * 1/2006 Zerbe ....................... 375/240.29
2006/0184685 A1 8/2006 Blasingame
2007/0056005 A1 * 3/2007 Kwon et al. .................. 725/107
2007/0056006 A1 * 3/2007 Kwon et al. .................. 725/107
2007/0056010 A1 * 3/2007 Kwon et al. .................. 725/133
2007/0056011 A1 * 3/2007 Kwon et al. .................. 725/133
2007/0056012 A1 * 3/2007 Kwon et al. .................. 725/133
2008/0037151 A1 * 2/2008 Fujimoto et al. ................ 360/18
2011/0052141 A1 * 3/2011 Takatsuji et al. .............. 386/231

FOREIGN PATENT DOCUMENTS

EP 1231795 A2 8/2002
WO 03058826 A2 7/2003
WO 2008/117234 A1 10/2008

OTHER PUBLICATIONS

Communication dated Jun. 28, 2010, issued by the European Patent Office in counterpart EP Application No. 08166980.6-2225.
"Silicon Image first to couple digital audio and video on the dvi link" Internet Citation, XP002202474, Retrieved from the Internet: URL:http:// www.siimage.com/press/press_print/p_01_16_01.asp, Jan. 16, 2001.
Eidson et al., "30.2: HDMI: High-Definition Multimedia Interface", SID 03 Digest, May 20, 2003, pp. 1024-1027, vol. XXXIV, Baltimore, MD.

* cited by examiner

*Primary Examiner* — Thao Le
(74) *Attorney, Agent, or Firm* — Sughrue Mion, PLLC

(57) ABSTRACT

An image apparatus and method for transmitting audio data are provided. Audio data of diverse formats are combined to form a single set of transmission data and transmitted in serial transmission over a single physical transmission line, so that convenient connection between A/V apparatuses can be provided.

20 Claims, 5 Drawing Sheets

IMAGE APPARATUS AND METHOD FOR TRANSMITTING AUDIO DATA

CROSS-REFERENCE TO RELATED APPLICATIONS

This application claims priority under 35 U.S.C. §119 from Korean Patent Application No. 10-2007-0130145, filed on Dec. 13, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing an image apparatus and a method for transmitting audio data, and more particularly, to providing an image apparatus which transmits audio data to and receives audio data from audio/video apparatuses in a serial transmission manner, and a method for transmitting audio data using the same.

2. Description of the Related Art

In general, audio signals are transmitted between audio/video (A/V) apparatuses in an analog manner or a digital manner. Recently, serial transmission, which is one form of digital transmission, has become widely used. Serial transmission includes the Audio Engineering Society/European Broadcasting Union (AES/EBU), Sony Philips Digital Interface (SPDIF), and High Definition Multimedia Interface (HDMI) protocols.

Audio data having a format which can be transmitted according to the SPDIF and HDMI protocols include decompressed audio data, such as Pulse Code Modulation (PCM) data, and audio data compressed using various compression formats, such as the Audio Coding-3 (AC3), Digital Theater System (DTS), and Moving Picture Experts Group (MPEG) formats. In such conventional serial transmission formats, audio data in a single format are transmitted over a single physical transmission line.

FIG. 1 illustrates a related art audio data transmission/reception system.

The audio data transmission/reception system includes a first source apparatus 10, a second source apparatus 30, a third source apparatus 50, an image apparatus 70, and a home theater 90.

The first source apparatus 10, the second source apparatus 30, and the third source apparatus 50 provide video and audio data. Specifically, the first source apparatus 10 provides audio data compressed using the MPEG format, the second source apparatus 30 provides audio data compressed using the DTS format, and the third source apparatus 50 provides audio data compressed using the AC3 format.

The image apparatus 70 displays video data provided by the first source apparatus 10, the second source apparatus 30, and the third source apparatus 50 on a screen. If the image apparatus 70 has only an MPEG decoding function, the image apparatus 70 decodes audio data provided by the first source apparatus 10, and outputs sound to a speaker which is mounted in the image apparatus 70. If the image apparatus 70 transmits the audio data provided by the first source apparatus 10 to the home theater 90, the home theater 90 outputs the audio data as sound corresponding to video data displayed on the image apparatus 70.

However, since the image apparatus 70 does not have a function for decoding audio data provided by the second source apparatus or the third source apparatus 50, the image apparatus 70 cannot output sound to the speaker and transmit the audio data to the home theater 90. Accordingly, the user must personally connect the second source apparatus 30 and the third source apparatus 50 to the home theater 90 so that the home theater 90 can output the audio data from the second source apparatus 30 and the third source apparatus 50 as sound.

Alternatively, if the second source apparatus 30 and the third source apparatus 50 perform DTS decoding and AC3 decoding directly and provide the image apparatus 70 with the decoded audio data, the image apparatus 70 can output sound corresponding to the decoded audio data to the speaker or transmit the decoded audio data to the home theater 90.

Alternatively, if the image apparatus 70 further has a decoder which performs DTS decoding and AC3 decoding, the audio data from the second source apparatus 30 and the third source apparatus 50 can be output to the speaker. If the image apparatus 70 does not have such a decoder and there is no home theater 90, the user cannot listen to the sound of the audio data provided by the second source apparatus 30 and the third source apparatus 50.

As described above, since audio data of a single format can be transferred between the source apparatuses 10, 30, and 50 and the image apparatus 70 over a single physical transmission route, if audio data which cannot be decoded by the image apparatus 70 are transmitted from the source apparatuses 10, 30, and 50, the user cannot listen to the sound through the speaker or is inconvenienced in connecting an external device such as the home theater 90 to the source apparatuses 10, 30, and 50. Alternatively, the image apparatus 70 may be required to include more decoders which can decode compressed audio data provided by the source apparatuses 10, 30, and 50, so the price of the image apparatus 70 increases.

Therefore, there is a need for transmitting audio data more conveniently.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An exemplary aspect of the present invention provides an image apparatus which transfers audio data over a single physical transmission route in serial transmission by combining audio data of diverse formats to form a single set of transmission data, and a method for transmitting audio data using the same, in order to provide simplified connection between A/V apparatuses.

Another exemplary aspect of the present invention provides an image apparatus which transfers decoded audio data together with compressed audio data in serial transmission, and a method for transmitting audio data using the same so that the image apparatus does not need additional decoders and thus the price of the image apparatus does not need to be increased.

According to an exemplary aspect of the present invention, there is provided an image apparatus including a data generation unit which generates transmission data by combining audio data in at least two formats, and a transmission unit which transmits the generated transmission data to an external receiving apparatus.

The audio data in at least two formats may include compressed audio data and PCM audio data.

The transmission unit may transmit the transmission data to the receiving apparatus using a serial transmission protocol.

The transmission unit may transmit the transmission data to the receiving apparatus using an HDMI protocol.

The image apparatus may further include a decoding unit which decodes the compressed audio data as the PCM audio data.

The image apparatus may further include a conversion unit which converts the PCM audio data decoded by the decoding unit to an analog audio signal, and a speaker unit which amplifies the analog audio signal output from the conversion unit and outputs the audio signal as sound.

The transmission unit may transmit the transmission data to the receiving apparatus using a single transmission channel.

The data generation unit may generate the transmission data by allocating a different identification (ID) to each of the audio data of the at least two formats.

The image apparatus may further include a receiving unit which receives at least one of the compressed audio data received from at least one transmission apparatus, the PCM audio data, and a broadcast signal broadcast by a broadcast station.

In order to transmit the transmission data to at least two receiving apparatuses, the transmission unit may transmit the transmission data to the at least two receiving apparatuses through transmission channels corresponding to the number of receiving apparatuses.

According to another exemplary aspect of the present invention, there is provided a transmission method including generating transmission data by combining audio data in at least two formats, and transmitting the generated transmission data to an external receiving apparatus.

The audio data in at least two formats may include compressed audio data and PCM audio data.

In the transmitting operation, the transmission data may be transmitted to the receiving apparatus in a serial transmission manner.

In the transmitting operation, the transmission data may be transmitted to the receiving apparatus using the HDMI protocol.

The transmission method may further include decoding the compressed audio data as PCM audio data.

The transmission method may further include converting the PCM audio data into an analog audio signal, and amplifying the analog audio signal and outputting the audio signal as sound.

In the transmitting operation, the transmission data may be transmitted to the receiving apparatus using a single transmission channel.

In the operation of generating the transmission data, the transmission data may be generated by allocating a different ID to each of the audio data of the at least two formats.

The transmission method may further include receiving at least one of the compressed audio data received from at least one transmission apparatus, the PCM audio data, and a broadcast signal broadcast from a broadcast station.

In the transmission operation, in order to transmit the transmission data to at least two receiving apparatuses, the transmission data may be transmitted to the at least two receiving apparatuses through transmission channels corresponding to the number of receiving apparatuses.

According to yet another exemplary aspect of the present invention, there is provided a image apparatus including a receiving unit which receives audio data in at least two formats, a decoding unit which decodes decodable audio data among the audio data in at least two formats, and a transmission unit which bypasses non-decodable audio data among the audio data in at least two formats.

According to yet another exemplary aspect of the present invention, there is provided a transmission method including receiving audio data in at least two formats, decoding decodable audio data among the audio data in at least two formats, and bypassing non-decodable audio data among the audio data in at least two formats.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
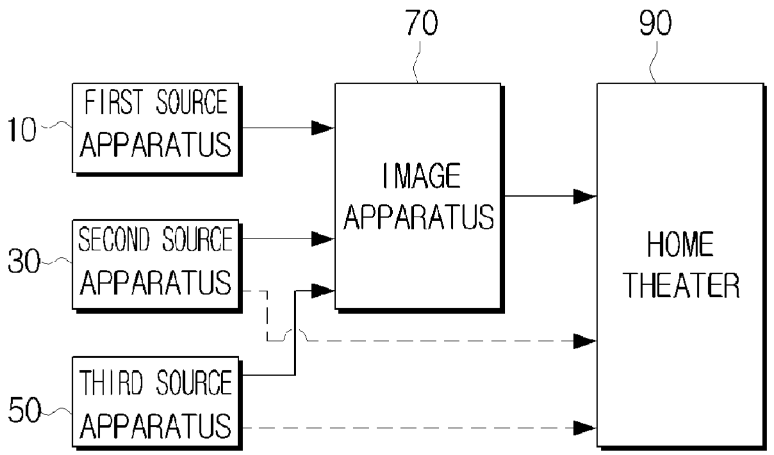
FIG. 1 (RELATED ART)
FIG. 1 illustrates a related art audio data transmission/reception system.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in excessive detail since they would obscure the invention unnecessarily.

Figure 2:
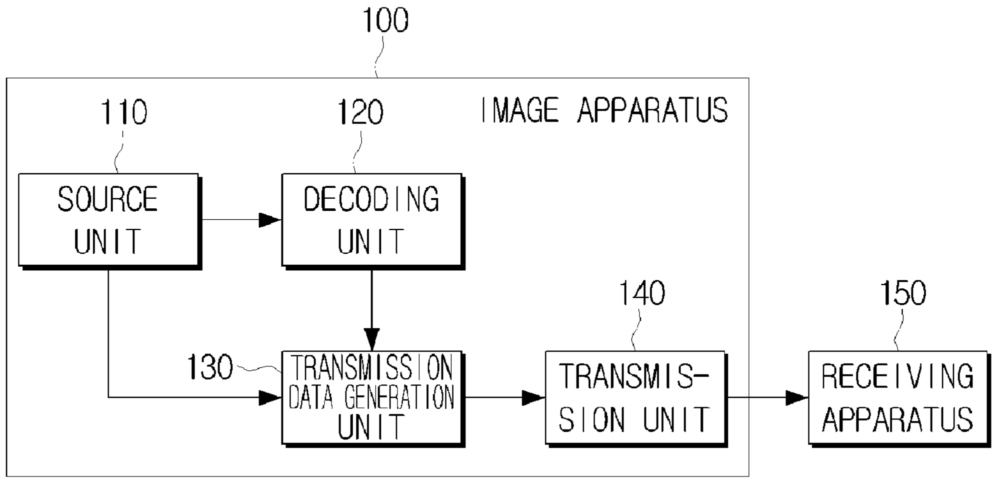
FIG. 2 is a schematic block diagram of an image apparatus according to an exemplary embodiment of the present invention.

FIG. 2 is a schematic block diagram of an image apparatus according to an exemplary embodiment of the present invention.

As shown in FIG. 2, the image apparatus 100 includes a source unit 110, a decoding unit 120, a transmission data generation unit 130, and a transmission unit 140.

The source unit 110 stores audio data compressed using various compression formats, such as AC3, DTS, MPEG, or Dolby true high definition (HD) formats.

The decoding unit 120 outputs decompressed PCM audio data by decoding audio data stored in the source unit 110.

The transmission data generation unit 130 generates transmission data by combining the compressed audio data stored in the source unit 110 with the PCM audio data output from the decoding unit 120. For example, the transmission data generation unit 130 allocates a different ID to the compressed audio data and to the PCM audio data, and generates transmission data which combines the audio data of the two formats. Accordingly, a receiving party can separate audio data from the transmission data by referring to the allocated IDs.

The transmission unit 140 transmits the generated transmission data to an external receiving apparatus 150 using serial transmission. That is, the transmission unit 140 transmits the audio data to the receiving apparatus 150 using a single serial transmission channel. The serial transmission protocol which is the most useful is the HDMI protocol.

Using the above structure, audio data in two or more formats can be combined and transmitted to the receiving apparatus 150. The receiving apparatus 150 decodes audio data in a decodable format by referring to the allocated IDs of the audio data output from the transmission unit 140, and thus outputs sound.

Figure 3:
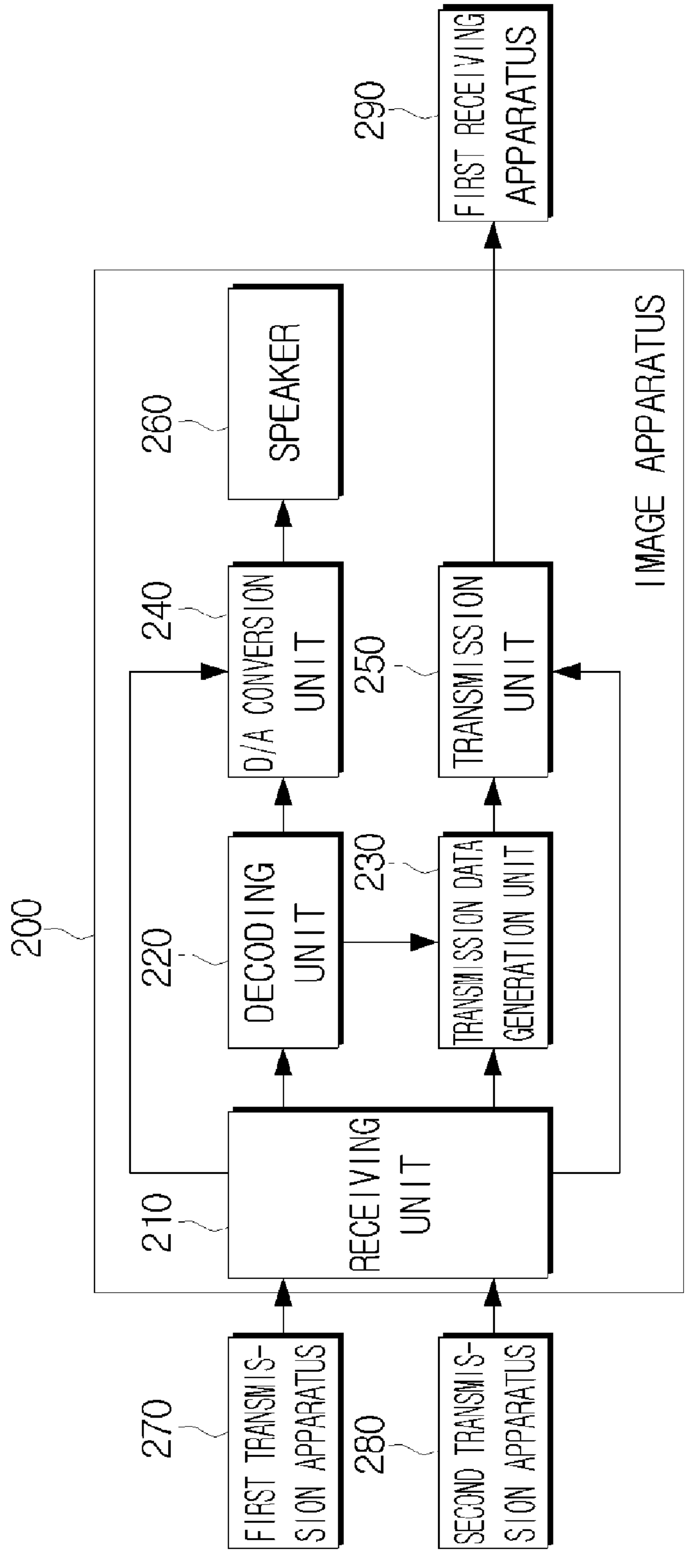
FIG. 3 is a schematic block diagram of an image apparatus according to a second exemplary embodiment of the present invention.

FIG. 3 is a schematic block diagram of an image apparatus according to a second exemplary embodiment of the present invention.

As shown in FIG. 3, the image apparatus 200 includes a receiving unit 210, a decoding unit 220, a transmission data generation unit 230, a digital/analog (D/A) conversion unit 240, a transmission unit 250, and a speaker 260.

It is assumed here that audio data provided by a first transmission apparatus 270 are audio data compressed in a first format which can be decoded by the image apparatus 200, and audio data provided by a second transmission apparatus 280 are audio data compressed in a second format which cannot be decoded by the image apparatus 200.

The receiving unit 210 receives audio data from the first transmission apparatus 270 and the second transmission apparatus 280.

The decoding unit 220 decodes the compressed audio data provided by the first transmission apparatus 270 from among the audio data received by the receiving unit 210. The decoded audio data are output to the D/A conversion unit 240 and the transmission data generation unit 230.

The D/A conversion unit 240 converts the decoded audio data into an analog audio signal, and the speaker 260 amplifies the analog audio signal output from the D/A conversion unit 240 to a certain volume and outputs the audio signal as sound.

The transmission data generation unit 230 combines the audio data in the first format and the second format received by the receiving unit 210 and the audio data decoded by the decoding unit 220 so that transmission data are generated. That is, the transmission data generation unit 230 generates transmission data by allocating different IDs to each kind of audio data.

The transmission unit 250 transmits the generated transmission data to a first receiving apparatus 290. The transmission unit 140 transmits the audio data of the three formats to the first receiving apparatus 290 using a single serial transmission channel. The serial transmission protocol which is the most useful is the HDMI protocol.

If the first transmission apparatus 270 and the second transmission apparatus 280 have the structure of the image apparatus 100 as shown in FIG. 2, the image apparatus 200 of FIG. 3 does not need to perform decoding and the D/A conversion unit 240 converts PCM audio data received by the receiving unit 210 into analog audio data. The transmission data generation unit 230 combines compressed audio data and PCM audio data provided by the first and second transmission apparatuses 270 and 280 respectively in order to generate transmission data. In another case, the compressed audio data and PCM audio data provided by the first and second transmission apparatuses 270 and 280 can be transmitted to the first receiving apparatus 290 through the transmission unit 250 without generating transmission data.

The first receiving apparatus 290 decodes audio data in a decodable format by referring to the allocated IDs of the audio data output from the transmission unit 250, and thus outputs the audio data as sound.

Figure 4:
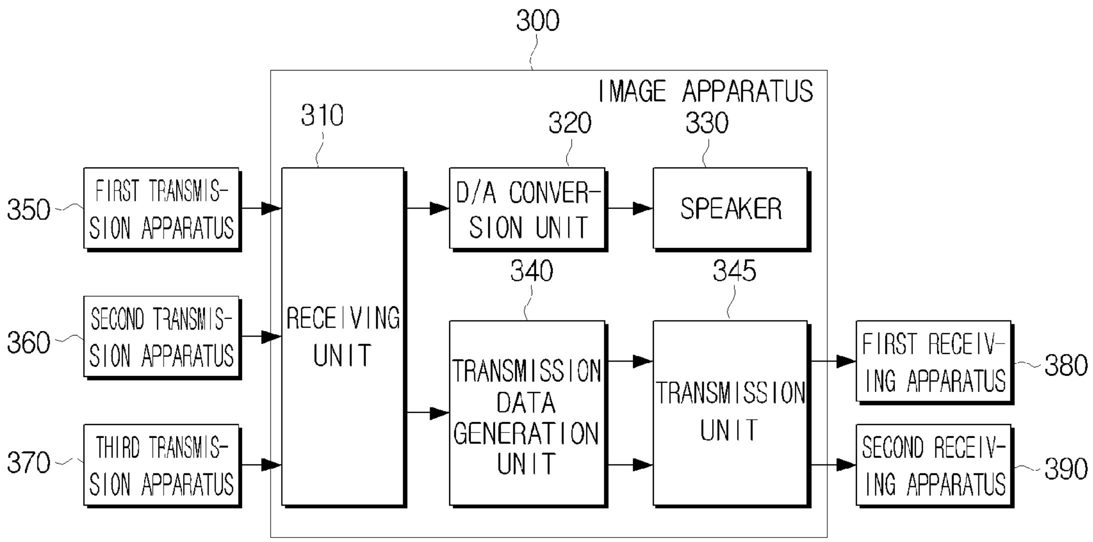
FIG. 4 is a schematic block diagram of an image apparatus according to a third exemplary embodiment of the present invention.

FIG. 4 is a schematic block diagram of an image apparatus according to a third exemplary embodiment of the present invention.

As shown in FIG. 4, the image apparatus 300 includes a receiving unit 310, a D/A conversion unit 320, a speaker 330, a transmission data generation unit 340, and a transmission unit 345.

A first transmission apparatus 350, a second transmission apparatus 360, and a third transmission apparatus 370 have the structure of the image apparatus 100 as shown in FIG. 2. Therefore, the first transmission apparatus 350 provides audio data compressed in a first format and PCM audio data which is decoded audio data, the second transmission apparatus 360 provides audio data compressed in a second format and PCM audio data which is decoded audio data, and the third transmission apparatus 370 provides audio data compressed in a third format and PCM audio data which is decoded audio data.

The receiving unit 310 receives audio data of diverse formats from the first transmission apparatus 350, the second transmission apparatus 360, and the third transmission apparatus 370.

The D/A conversion unit 320 converts the PCM audio data from among the audio data received by the receiving unit 310 into an analog audio signal, and the speaker 330 amplifies the analog audio signal output from the D/A conversion unit 320 to a certain volume and outputs the audio signal as sound.

The transmission data generation unit 340 generates transmission data by combining the audio data of diverse formats received by the receiving unit 310. That is, the transmission data generation unit 340 generates transmission data to be transmitted to a first receiving apparatus 380 and generates transmission data to be transmitted to a second receiving apparatus 390. For example, transmission data to be transmitted to the first receiving apparatus 380 are generated by combination of the audio data of the two formats from the first transmission apparatus 350 and the audio data of the two formats from the second transmission apparatus 360. In addition, transmission data to be transmitted to the second receiving apparatus 390 are generated by combination of the audio data compressed in the second format from the second transmission apparatus 360 and the audio data of the two formats from the third transmission apparatus 370.

The transmission unit 345 transmits part of the transmission data generated by the transmission data generation unit 340 to the first receiving apparatus 380 through a first serial transmission channel, and transmits the remaining transmission data to the second receiving apparatus 390 through a second serial transmission channel.

In FIG. 4, transmission data are transmitted to the two receiving apparatuses 380 and 390 through the two serial transmission channels. Transmission data may also be transmitted to two or more receiving apparatuses through two or more serial transmission channels. The two receiving apparatuses 380 and 390 decode audio data of a decodable format with reference to the IDs of the audio data output from the transmission unit 345, and thus output the audio data as sound.

Figure 5:
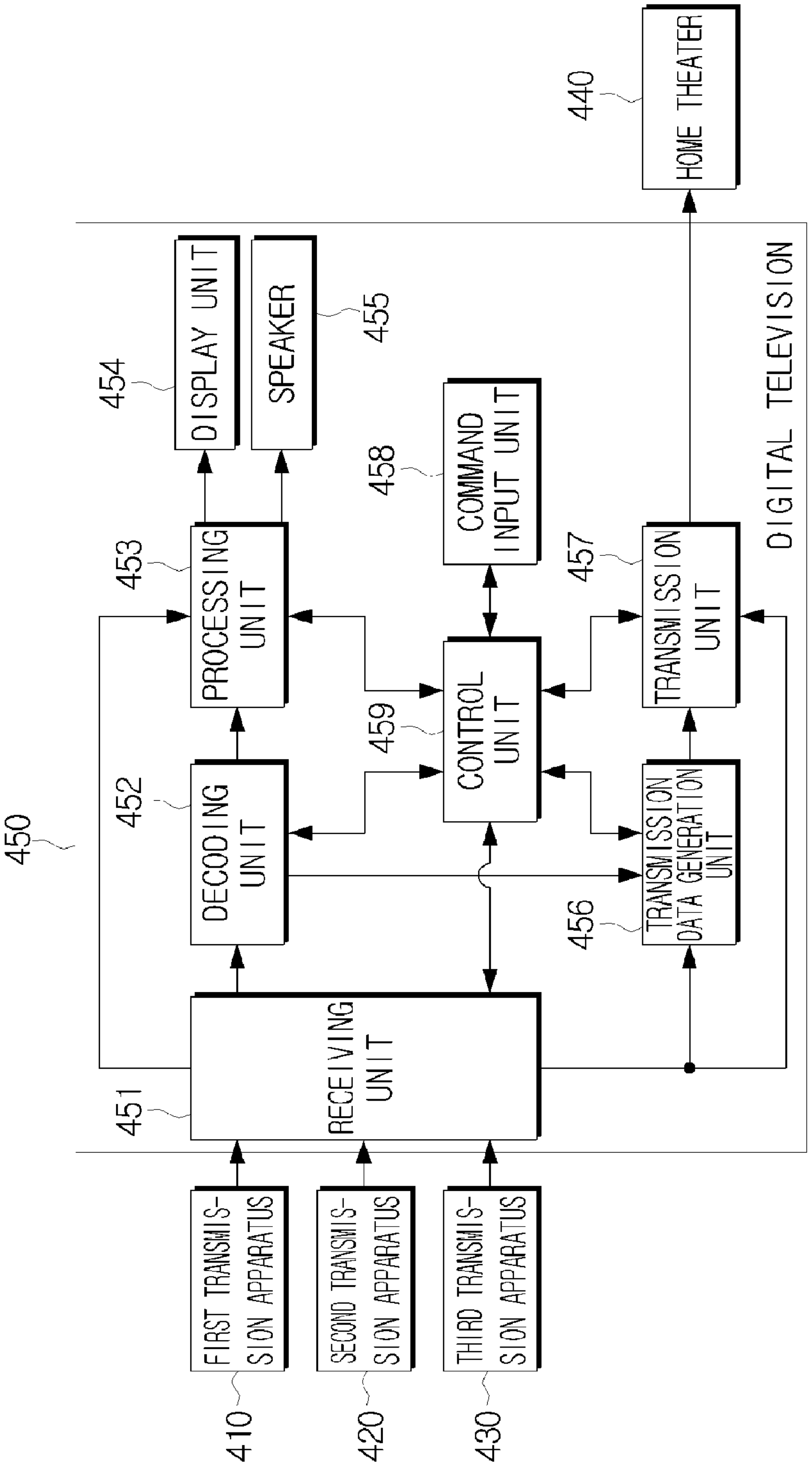
FIG. 5 is a schematic block diagram illustrating a digital television as an image apparatus according to a fourth exemplary embodiment of the present invention.

FIG. 5 is a schematic block diagram illustrating a digital television as an image apparatus according to a fourth exemplary embodiment of the present invention.

As shown in FIG. 5, the digital television 450 includes a receiving unit 451, a decoding unit 452, a processing unit 453, a display unit 454, a speaker 455, a transmission data generation unit 456, a transmission unit 457, a command input unit 458, and a control unit 459.

A first transmission apparatus 410 provides video data and audio data which are compressed using the MPEG format, a second transmission apparatus 420 provides audio data compressed using the DTS format, and a third transmission apparatus 430 provides audio data compressed in the AC3 format and PCM audio data which is the decoded audio data compressed using the AC3 format. The decoding unit 452 of the digital television 450 decodes video data and audio data which are compressed using the MPEG format. A home theater 440 has a function for decoding audio data compressed using the AC3 and DTS formats.

The receiving unit 451 receives the video data and audio data which are compressed using the MPEG format from the first transmission apparatus 410, receives the audio data compressed using the DTS format from the second transmission apparatus 420, and receives the audio data compressed using the AC3 format and the PCM audio data, which is the decoded audio data compressed using the AC3 format, from the third transmission apparatus 430. In addition, the receiving unit 451 may receive broadcast data from a broadcast station (not shown).

The decoding unit 452 decodes the broadcast data, or video data and audio data compressed using the MPEG format, and outputs the decoded data to the processing unit 453. The audio data decoded by the decoding unit 452 is PCM audio data, and the PCM audio data are output to the processing unit 453 and the transmission data generation unit 456.

The processing unit 453 processes the decoded video data and outputs a displayable signal to the display unit 454, so the display unit 454 displays the video data as an image. The processing unit 453 converts the decoded audio data into an analog audio signal, and the speaker 455 amplifies the analog audio signal output from the processing unit 453 to a certain volume and outputs the audio signal as sound.

According to the control of the control unit 459, the transmission data generation unit 456 combines all of the audio data received by the receiving unit 451 and the PCM audio data decoded by the decoding unit 452, so that transmission data are generated. For example, the transmission data generation unit 456 generates transmission data in which different IDs are allocated to the audio data of each different format.

The transmission unit 457 transmits the generated transmission data to the home theater 440 using serial transmission. That is, the transmission unit 457 transmits the audio data of two formats having different IDs to the home theater 440 using a single serial transmission channel. The serial transmission protocol which is the most useful is the HDMI protocol.

The command input unit 458 receives user commands to operate the digital television 450 and transmits the user commands to the control unit 459.

The control unit 459 operates the digital television 450 according to a user command input through the command input unit 458. If a user command to select audio data to be transmitted to the home theater 440 is input, the control unit 459 operates the transmission data generation unit 456 to generate transmission data containing the selected audio data, and then operates the transmission unit 457 to transmit the generated transmission data to the home theater 440.

For example, in order to transmit to the home theater 440 audio data compressed using the MPEG format which is provided by the first transmission apparatus 410 and audio data compressed using the DTS format which is provided by the second transmission apparatus 420, the control unit 459 operates the transmission data generation unit 456 to generate transmission data by combination of the PCM audio data output from the decoding unit 452 and audio data compressed using the DTS format which is received by the receiving unit 451. Following this process, the home theater 440 can output the audio data provided by the first transmission apparatus 410 and the second transmission apparatus 420 as sound.

Figure 6:
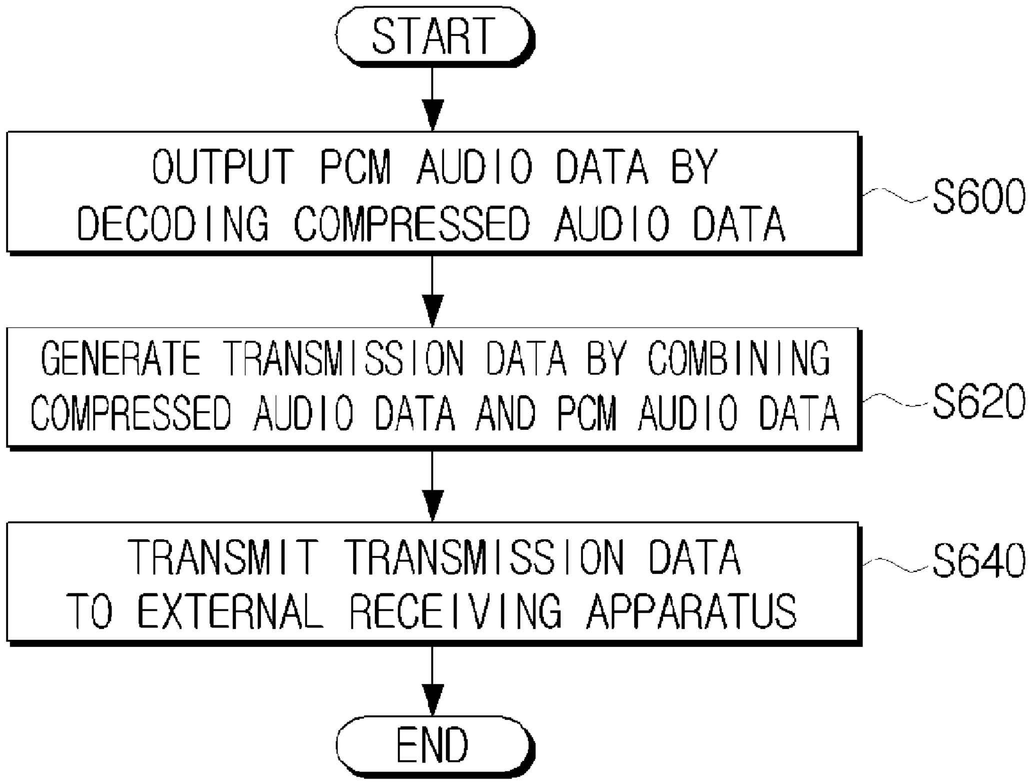
FIG. 6 is a flowchart illustrating the operation of an image apparatus according to an exemplary embodiment of the present invention.

FIG. 6 is a flowchart illustrating the operation of an image apparatus according to an exemplary embodiment of the present invention.

As shown in FIG. 6, the image apparatus 100 according to an exemplary embodiment of the present invention decodes compressed audio data, and thereby outputs PCM audio data (S600). Subsequently, the image apparatus 100 combines the compressed audio data and the PCM audio data, and thereby generates transmission data (S620). For example, the compressed audio data and the PCM audio data are allocated different IDs, and are combined to generate transmission data.

Next, the image apparatus 100 transmits the transmission data to the external receiving apparatus 150 (S640) using serial transmission. That is, the image apparatus 100 transmits the audio data of two formats having different IDs to the receiving apparatus 150 using a single serial transmission channel. The serial transmission protocol which is the most useful is the HDMI protocol.

In the above exemplary embodiment, the transmission data are generated by allocating a different ID to each audio data format among diverse formats, but a method for generating transmission data is not limited thereto. A serial transmission protocol which may be used is the HDMI protocol, but any serial transmission protocol able to transmit compressed audio data and PCM audio data can be applied.

As can be appreciated from the above description, audio data of diverse formats are combined to form a single set of transmission data and transmitted using serial transmission over a single physical transmission line, and decoded audio data are transmitted together with compressed audio data in serial transmission, so that convenient connection between A/V apparatuses can be provided and the cost of the A/V apparatus does not need to be increased due to additional decoders.

The foregoing exemplary embodiments are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. An image apparatus comprising:

a receiving unit which receives a plurality of audio data of different formats from a plurality of source apparatuses;

a data generation unit which generates transmission data by combining the plurality of audio data of different formats; and a transmission unit which transmits the generated transmission data to an external receiving apparatus, wherein the plurality of audio data of different formats comprise a plurality of compressed audio data.

2. The image apparatus of claim 1, wherein the plurality of audio data of different formats further comprise Pulse Code Modulation (PCM) audio data.

3. The image apparatus of claim 1, wherein the transmission unit transmits the generated transmission data to the receiving apparatus using a serial transmission protocol.

4. The image apparatus of claim 1, wherein the transmission unit transmits the generated transmission data to the receiving apparatus using a High Definition Multimedia Interface (HDMI) protocol.

5. The image apparatus of claim 2, further comprising a decoding unit which decodes the compressed audio data to obtain the PCM audio data.

6. The image apparatus of claim 5, further comprising a conversion unit which converts the PCM audio data obtained by the decoding unit to an analog audio signal; and a speaker unit which amplifies the analog audio signal output from the conversion unit and outputs the audio signal as sound.

7. The image apparatus of claim 1, wherein the transmission unit transmits the transmission data to the receiving apparatus using a single transmission channel.

8. The image apparatus of claim 1, wherein the data generation unit generates the transmission data by allocating a different identification(ID) to each of the audio data of at least two formats.

9. The image apparatus of claim 2, further comprising a receiving unit which receives at least one of the compressed audio data received from at least one transmission apparatus, the PCM audio data, and a broadcast signal broadcast by a broadcast station.

10. The image apparatus of claim 1, wherein the transmission data is transmit to at least two receiving apparatuses, and the transmission unit transmits the transmission data to the at least two receiving apparatuses through a number of transmission channels corresponding to a number of receiving apparatuses.

11. A transmission method comprising:

receiving a plurality of audio data of different formats from a plurality of source apparatuses;

generating transmission data by combining the plurality of audio data of different formats; and transmitting the generated transmission data to an external receiving apparatus, wherein the plurality of audio data of different formats comprise a plurality of compressed audio data.

12. The transmission method of claim 11, wherein the plurality of audio data of different formats further comprise Pulse Code Modulation (PCM) audio data.

13. The transmission method of claim 11, wherein the transmitting the generated transmission data comprises transmitting the transmission data to the receiving apparatus in a serial transmission manner.

14. The transmission method of claim 11, wherein the transmitting the generated transmission data comprises transmitting the transmission data to the receiving apparatus using a High Definition Multimedia Interface (HDMI) protocol.

15. The transmission method of claim 12, further comprising decoding the compressed audio data to obtain PCM audio data.

16. The transmission method of claim 15, further comprising converting the PCM audio data into an analog audio signal; and amplifying the analog audio signal and outputting the audio signal as sound.

17. The transmission method of claim 11, wherein the transmitting the generated transmission data comprises transmitting the transmission data to the receiving apparatus using a single transmission channel.

18. The transmission method of claim 11, wherein the generating transmission data comprising generating the transmission data by allocating a different identification(ID) to each of the audio data of at least two format.

19. The transmission method of claim 12, further comprising receiving at least one of the compressed audio data received from at least one transmission apparatus, the PCM audio data, and a broadcast signal broadcast from a broadcast station.

20. The transmission method of claim 11, wherein the transmitting the generated transmission data comprises transmitting the transmission data to at least two receiving apparatuses through a number of transmission channels corresponding to a number of receiving apparatuses.

* * * * *